United States Patent
Yang (10) Patent No.: US 7,564,912 B2
(45) Date of Patent: Jul. 21, 2009

(54) METHOD AND APPARATUS FOR CHANNEL STATE INFORMATION GENERATION IN A DVB-T RECEIVER

(75) Inventor: Shun-an Yang, Sihu Township (TW)

(73) Assignee: MEDIATEK Inc., Hsin-Chu (TW)

( * ) Notice: Subject to any disclaimer, the term of this patent is extended or adjusted under 35 U.S.C. 154(b) by 612 days.

(21) Appl. No.: 11/354,440

(22) Filed: Feb. 15, 2006

(65) Prior Publication Data
US 2007/0189402 A1   Aug. 16, 2007

(51) Int. Cl.
*H04K 1/10*   (2006.01)
*H04L 27/28*   (2006.01)

(52) U.S. Cl. .................. 375/260; 375/346; 375/285; 375/278; 455/67.11; 455/67.13

(58) Field of Classification Search .............. 375/260, 375/346, 285, 278, 350, 340; 455/67.11, 455/67.13
See application file for complete search history.

(56) References Cited

U.S. PATENT DOCUMENTS

| 6,456,316 | B1 | 9/2002 | Jun |
| 6,603,734 | B1 | 8/2003 | Oksanen |
| 7,116,981 | B2 * | 10/2006 | Jeon et al. .............. 455/450 |
| 7,430,256 | B2 * | 9/2008 | Zhidkov .................. 375/346 |
| 2004/0218519 | A1 | 11/2004 | Chiou |
| 2006/0222097 | A1 * | 10/2006 | Gupta et al. ............ 375/260 |
| 2007/0116138 | A1 * | 5/2007 | Tsai et al. ............... 375/260 |
| 2008/0260052 | A1 * | 10/2008 | Hayashi .................. 375/260 |

FOREIGN PATENT DOCUMENTS

| EP | 0991239 A2 | 4/2000 |
| EP | 1054541 A2 | 11/2000 |
| EP | 1349337 A2 | 10/2003 |
| GB | 2340353 A | 2/2000 |

* cited by examiner

*Primary Examiner*—Phuong Phu (57) ABSTRACT

A method and apparatus for channel state information generation in a DVB receiver. The present invention comprises: obtaining the magnitude of an error signal and a channel response signal of a sub-carrier; combining the magnitude of the error signal and the magnitude of the channel response signal of each sub-carrier; averaging the magnitudes of the error signals for sub-carriers; calculating the ratio of the channel response signal and the average of the magnitudes of the error signals; and generating a channel state information according to the ratio for the sub-carrier of the OFDM symbol. The method exhibits good performance in either a channel with the AWGN or with co-channel interference, and provides a quick convergence in initialization for the receiver to mitigate the channel impulse response.

33 Claims, 8 Drawing Sheets

METHOD AND APPARATUS FOR CHANNEL STATE INFORMATION GENERATION IN A DVB-T RECEIVER

FIELD OF THE INVENTION

The present invention generally relates to a method and apparatus for channel state information generation, and more particularly to a method and apparatus for channel state information generation in a Digital Video Broadcast Terrestrial (DVB-T) receiver.

BACKGROUND OF THE INVENTION

In an Orthogonal Frequency Division Multiplexing (OFDM) modulation system employed in a DVB-T transmitter and receiver system, the channel state information (CSI) is applied to increase the reliability of each sub-carrier so that the Bit Error Rate (BER) after a channel decoder can be decreased. It is significantly important in a frequency selective fading channel, and methods generating CSI have been disclosed. Generally, these channel state informations are defined based on a magnitude of a channel frequency response signal in each sub-carrier or an SNR (signal to noise ratio) of each sub-carrier. The former method can have good performance when the noise brought to the channel is Additive White Gaussian Noise (AWGN) or in a static channel. However, it does not exhibit good performance in a channel with co-channel interference, which is the real environments where the OFDM signals are broadcasted. For example, some inherent analog TV channel may be mixed with the DVB-T (Digital Video Broadcasting Terrestrial) channel and co-channel interference is generated as a result. In such case, using magnitude of a channel frequency response may result in an unreliable CSI caused by severe interference to those sub-carriers. The method using a temporal-averaged SNR of each sub-carrier as CSI can solve this problem of co-channel interference. However, there are two drawbacks of this method. First, an inaccuracy of SNR estimation may cause additional degradation in AWGN environment. Second, a temporal-averaged SNR does not respond quickly to the channel change in mobile environment.

Figure 1:
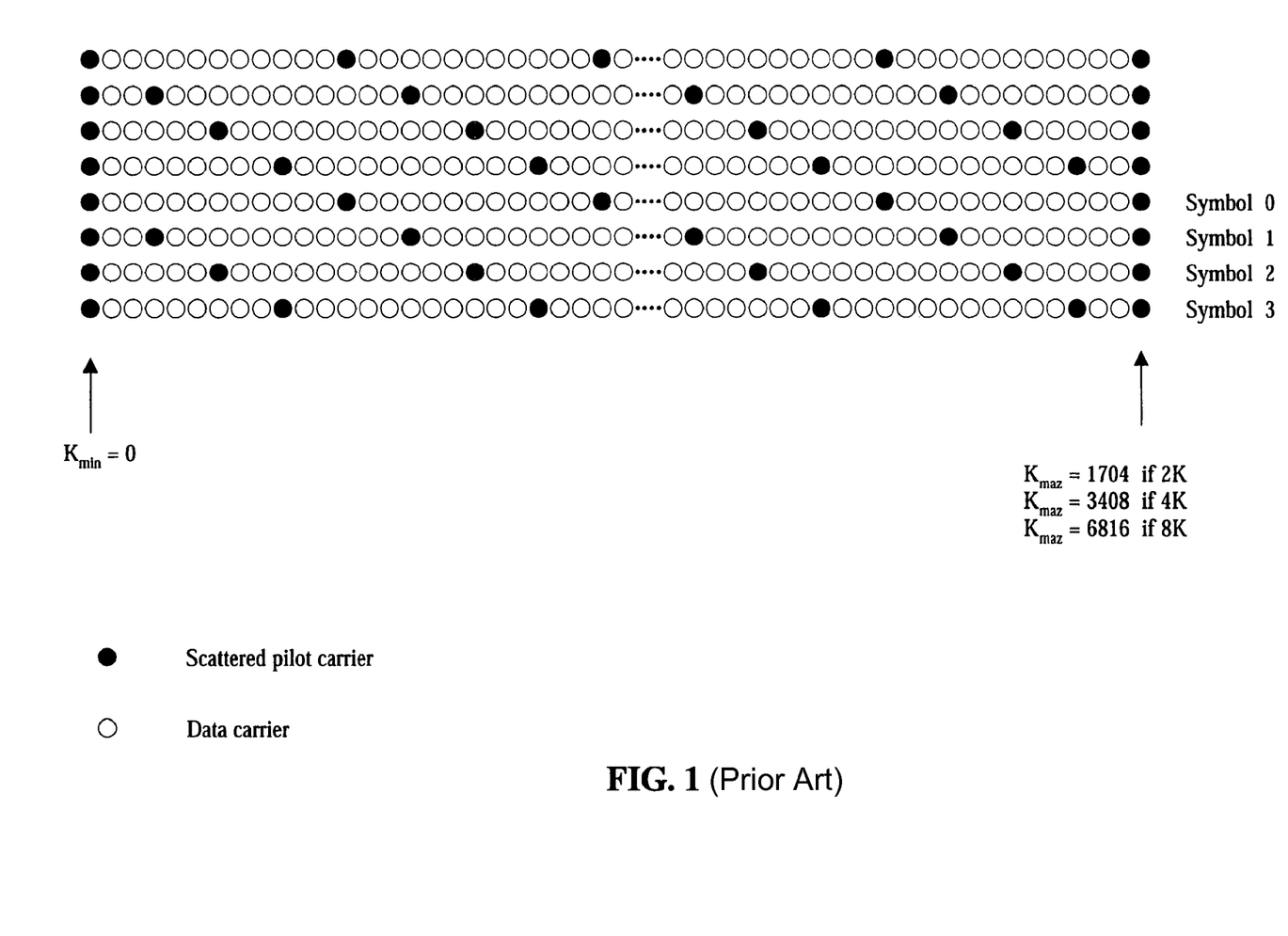
FIG. 1 shows a transmission frame of scattered pilot carrier and data carrier array in a DVB-T system.

Please refer to FIG. 1, which shows a portion of a transmitted DVB-T frame including the scattered pilot carriers and data carriers transmitted in the DVB-T system. The transmitter in a DVB-T system may generate the I (In-phase) and the Q (Quadrature) data signals according to a modulation format, such as QPSK (Quadrature Phase Shift Keying), 16-QAM (Quadrature Amplitude Modulation), 64-QAM, etc., the pilot signals and TPS signals, corresponding to the BPSK constellation, are inserted according to the DVB-T frame structure, and the I/Q signals of all sub-carriers are transformed into a time domain OFDM symbol. Each symbol may be made up of a number of active carriers, and the number of active carriers is depending on the operation mode. For example, there may be 6817 active carriers in 8K mode, 3409 active carriers in 4K mode or 1705 active carriers in 2K mode, as shown in FIG. 1. In this drawing, the scattered pilot carriers are marked with solid circles, and data carriers are marked with empty circles. The aforementioned rules relating to modulation, number of active carriers, and operation mode are described in European Telecommunication Standard Institute standards.

Figure 2:
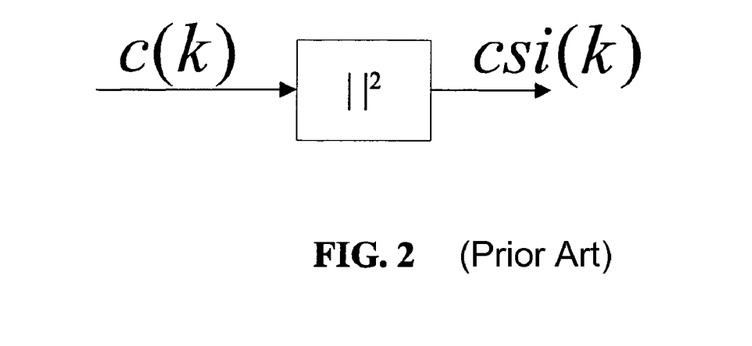
FIG. 2 illustrates a conventional calculating method using a square of the magnitude of a channel frequency response in each sub-carrier as channel state information (CSI) according to one prior art.

Please refer to FIG. 2, a conventional CSI calculating method using magnitude of a channel frequency response signal in each sub-carrier is shown, where c(k) is the magnitude of a channel frequency response and "k" is the index representing each sub-carrier. The conventional method directly squares the magnitude of the channel response signal as the CSI for decoding the OFDM symbol subsequently. This method is based on an assumption that the noises in all sub-carriers are flat, (i.e. the noise in each sub-carrier is of equal power). Therefore, the sub-carrier with larger channel frequency response through such calculation results a larger CSI. However, an unpredictable co-channel interference comes as an unavoidable consequence of channel reuse, which makes the assumption of flat noise incorrect. In addition, the amount of co-channel interference is determined by how the channels are reused spatially. Therefore, a method correctly estimating the CSI of each sub-carrier is required in a real environment.

Figure 3:
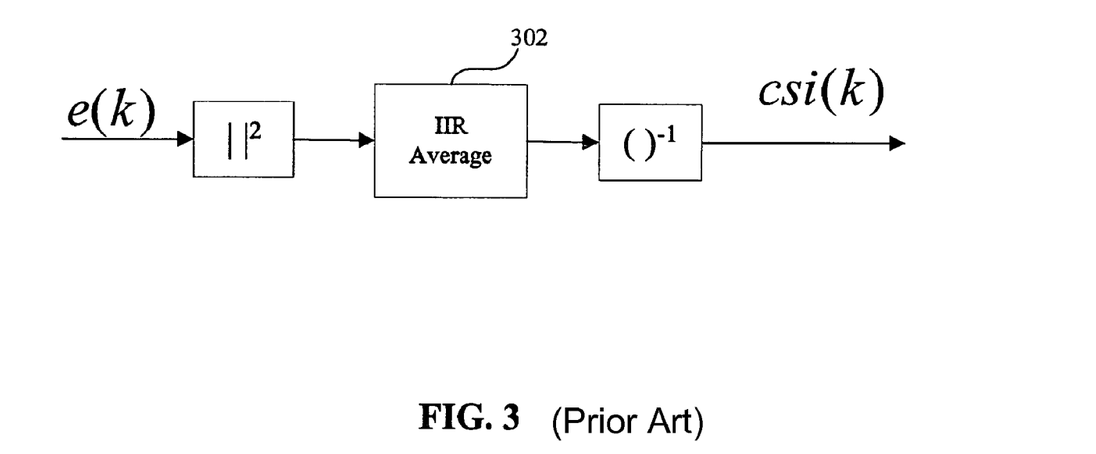
FIG. 3 illustrates another conventional calculating method using the temporal-averaged SNR of each sub-carrier as channel state information (CSI).

Please refer to FIG. 3, another conventional CSI calculating method using the time-averaged SNR of each sub-carrier determining CSI is shown. This method can solve the aforementioned problem resulted from the co-channel interference. The e(k) is the error signal, and "k" is the index representing each sub-carrier. As shown in FIG. 6, the error signal e(k) is defined as the minimum magnitude of the difference from the equalized result to the ideal constellation point. The mean square error (MSE) of the error signals is calculated directly by temporarily averaging (recursive averaging over OFDM symbols by the Infinite Impulse Response Filters, IIR average unit 302) the square of error signals and the MSE is inversed to obtain the CSI for decoding the OFDM symbol later. This method can mitigate the co-channel interference or other types of interference caused by other reasons, e.g. interference caused by adjacent channels. However, the drawback of this method is the bad performance in mobile channel. In a mobile channel environment, the SNR in a sub-carrier can change with time; the conventional method derives only the averaged SNR and does not take the time variation of the channel into consideration.

Either of the conventional methods for generating CSI as described with reference to FIG. 2 or FIG. 3, extracts the scattered pilot carriers and calculates the I/Q signals of each sub-carrier to generate CSI as well known. The CSI of $k_{th}$ carrier is indicated by csi(k), which is applied when generating the soft bits for the channel decoder. As described above, the conventional method shown in FIG. 2 employs the magnitude of the channel response signal but the conventional method shown in FIG. 3 employs the temporal-averaged SNR to generate the CSI extracted from each sub-carrier of the OFDM symbols. Accordingly, either of the conventional methods exhibits good performance only in particular environments, such as an AWGN environment (white noise) or static channel with co-channel interference (color noise). Considering a real environment, there is a need to develop a method and apparatus exhibiting good performance to work well in either a static or mobile channel with either AWGN or co-channel interference.

SUMMARY OF THE INVENTION

To solve the foregoing drawbacks in the prior arts, it is an objective of the present invention to provide a method and apparatus for channel state information (CSI) generation capable of exhibiting good performance in both the static and mobile communication environments.

Another objective of the present invention is to provide a method and apparatus for channel state information generation in a DVB-T receiver that can perform well with both co-interference and AWGN. In addition, the present method also has the advantage of quick convergence in initialization when the system is suffering large delay spread of channel impulse response.

To accomplish the above objects, the present invention provides a method for channel state information (CSI) generation in a DVB-T receiver, the method comprising the steps of:

obtaining a magnitude of an error signal and a magnitude of a channel response signal of one of the sub-carriers;

averaging the magnitudes of the error signals for the sub-carriers;

calculating a ratio on the magnitude of the channel response signal and the average of the magnitudes of the error signals; and generating a channel state information according to the ratio for said one of the sub-carriers.

The present invention has quick convergence in initialization when the system is suffering large delay spread of channel impulse response.

The present invention further comprises steps of squaring the magnitude of each error signal before the averaging step and taking the square root on the ratio to generate the channel state information. Furthermore, for reducing the required memory size during the averaging step, the present invention can also consider noise signal variances of a plurality of continuous sub-carriers as the same. Two approaches applied in this reduced memory averaging steps are described below. The present invention considers the error signals of a plurality of continuous sub-carriers as the same to reduce the number of times for accessing the memory during the averaging step and to reduce the occupied bits in the memory. In an alternative way, the present invention can accumulate the error signals of a plurality of sub-carriers then update the corresponding memory address using the IIR filter. Furthermore, the present invention may take the square root of values before storing into the memory to reduce the occupied bits in the memory without losing the dynamic range.

Specifically, the present invention further comprises a step of combining the magnitude of the error signal and the magnitude of the channel response signal before the averaging step. This step isolates the noise signal from the channel response signal. Therefore, the present method has good performance in AWGN environment, co-interference environment, and mobile environment.

The apparatus for channel state information (CSI) generation in a DVB-T receiver comprises a calculating unit, an averaging unit and a channel state information (CSI) generating unit. The calculating unit receives the error signal and the channel response signal to obtain respective magnitudes of the sub-carriers. The averaging unit averages the magnitudes. The channel state information (CSI) generating unit calculates the ratio of the magnitude of the channel response signal and the average of the magnitudes of the error signals to generate the channel state information (CSI), which is employed by the subsequent error correaction decoder. Consequently, the channel state information (CSI) with high reliability can be obtained for accurately decoding the OFDM symbols subsequently.

Accordingly, a method and apparatus exhibiting good performance to work well in either a channel with the AWGN or in a channel with co-channel interference is provided. In addition, the preferred method and apparatus also work well in both static and mobile environments.

BRIEF DESCRIPTION OF THE DRAWINGS

The foregoing aspects and many of the attendant advantages of this invention will become more readily appreciated and better understood by reference to the following detailed descriptions, when taken in conjunction with the accompanying drawings, wherein.

DETAILED DESCRIPTION OF THE PREFERRED EMBODIMENTS

Figure 4:
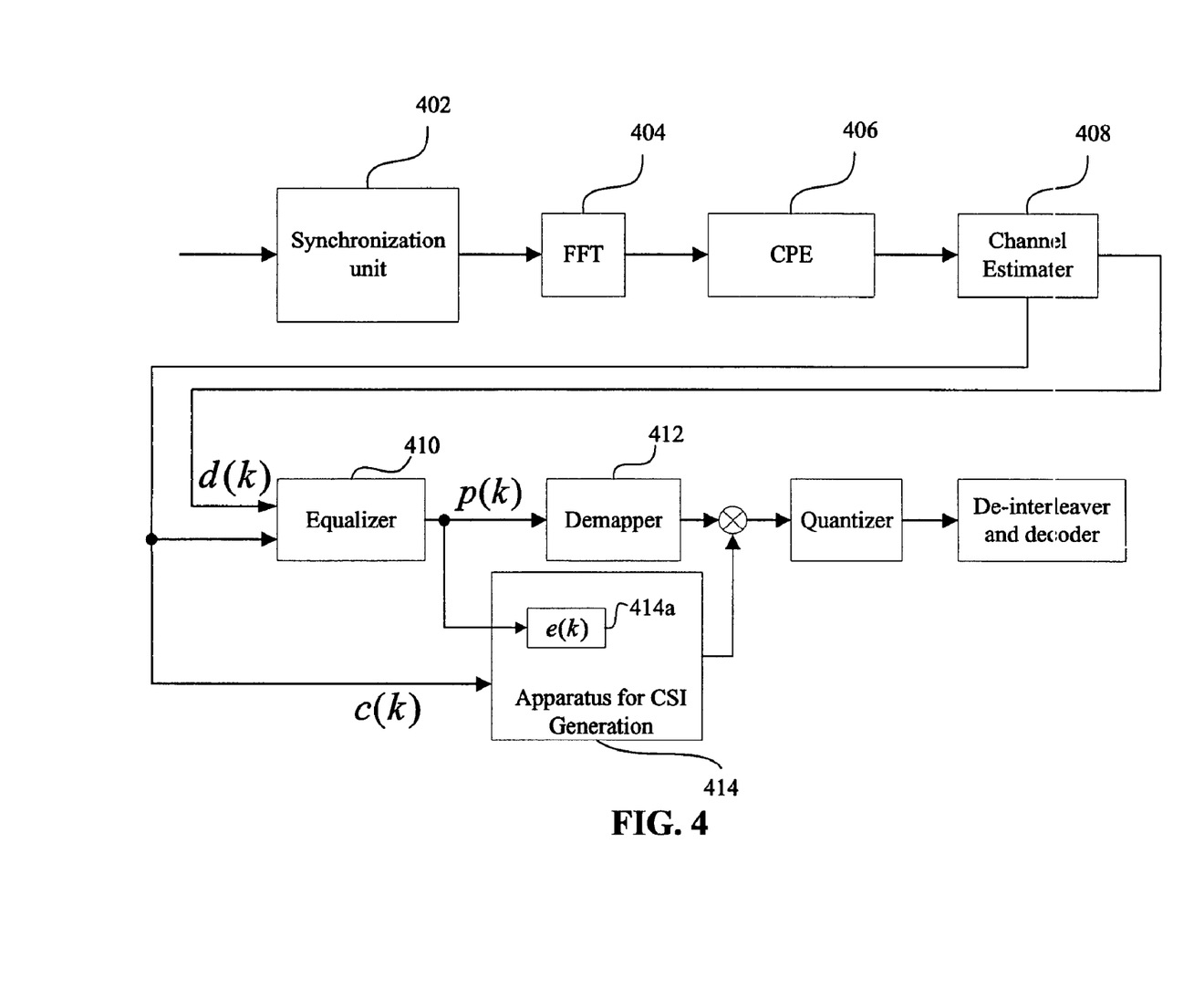
FIG. 4 is a block diagram showing a portion of a DVB-T receiver in an embodiment according to the present invention.

Please refer to FIG. 4, which is a block diagram showing a portion of a DVB-T receiver in an embodiment according to the present invention. The DVB-T receiver at least comprises a channel estimator 408, an equalizer 410, a demapper 412 and an apparatus for channel state information (CSI) generation 414 including an error signal calculation unit 414a. A synchronization unit 402 first executes the time and frequency synchronization and removes the Guard-Interval of the OFDM symbols, and then the processed OFDM signals are transmitted into a FFT block 404 to be transformed from the time domain into the frequency domain. A Common Phase Error (CPE) block 406 is employed to compensate the phase noise. The channel estimator 408 estimates the channel response signal c(k) according to the pilot information of the sub-carrier and transmits the original signal d(k) and the channel response signal c(k) to the equalizer 410. The original signal d(k) is the signal directly passing through the channel estimator 408 without any change. The equalizer 410 equalizes the sub-carrier based on the estimated channel response signal c(k) and generates an equalized signal p(k). For example, equalized signal p(k) can be obtained simply by dividing d(k) by c(k). The error signal calculation unit 414a generates an error signal e(k) of the sub-carrier according to the equalized signal p(k), where the error signal e(k) can simply be defined as a minimal distant vector from p(k) to constellation points as shown in FIG. 6B (in details later). The equations related with the equalized signal p(k) and the error signal e(k) are listed below.

As aforementioned, the equalized signal p(k) can be defined as dividing d(k) by c(k) and expressed as the following:

$$p(k) = \frac{d(k)}{c(k)} \qquad \text{Eq (1)}$$

Both the equalized signal p(k) and the error signal e(k) are distant vectors comprising real portions indicating by the index "x" and imaginary portions indicating by "y" multiplied by a coefficient "j". The equalized signal p(k) and the error signal e(k) can be expressed as the following:

$$p(k)=p_x(k)+j^*p_y(k) \qquad \text{Eq (2)}$$

$$e(k)=e_x(k)+j^*e_y(k) \qquad \text{Eq (3)}$$

The definition for the absolute value of error signal e(k) is a minimal distance from p(k) to constellation points $g_i$. First, calculations for the absolute values of error signal e(k) in real portion and imaginary portion respectively can be expressed as the following:

$$|e_x(k)| = \min_i |p_x(k) - g_i| \qquad \text{Eq (4)}$$

$$|e_y(k)| = \min_i |p_y(k) - g_i| \qquad \text{Eq (5)}$$

The calculation for the absolute value of the error signal e(k) in constellation map, which is a Euclid Coordinate, can be expressed as the following:

$$|e(k)|^2 = |e_x(k)|^2 + |e_y(k)|^2 \qquad \text{Eq (6)}$$

$$|e(k)| = \sqrt{|e_x(k)|^2 + |e_y(k)|^2} \qquad \text{Eq (7)}$$

The demapper 412 demapps the equalized signal p(k) from the equalizer 410 according to a constellation map and generates soft bits, which is then multiplied by the CSI of the corresponding sub-carrier. The apparatus for channel state information (CSI) generation 414, which is coupled to the channel estimator 408 and the equalizer 410, receives the channel response signal c(k) and generates the error signal e(k) of the sub-carrier, then proceeds some calculation to generate the channel state information (CSI) for the subsequent error correaction decoding process.

The apparatus for channel state information generation comprises the error signal calculation unit, a calculating unit, an averaging unit and a channel state information generating unit. The calculating unit receives the error signal e(k) from the error signal calculation unit and the channel response signal c(k) from the equalizer 410 to calculate the respective magnitudes of a sub-carrier (in details later). The averaging unit averages the magnitudes of the error signal e(k) and the channel response signal c(k). The channel state information generating unit calculates the ratio of the channel response signal c(k) and the average of the magnitudes of the error signals e(k) to generate the channel state information csi(k) for the sub-carrier.

Figure 5:
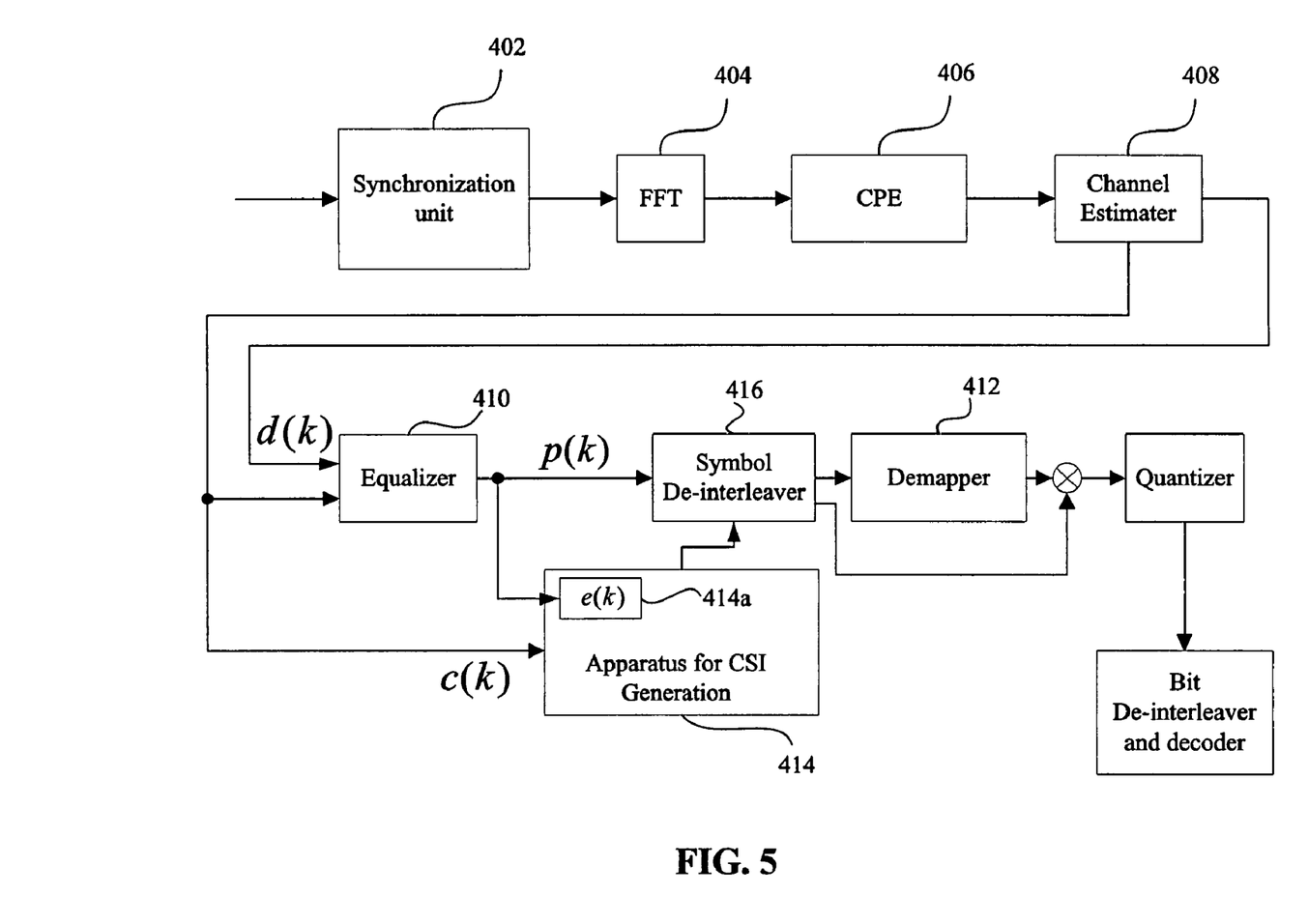
FIG. 5 is another block diagram showing a portion of a DVB-T receiver in another embodiment according to the present invention.

Please refer to FIG. 5, which is a block diagram showing a portion of a DVB-T receiver in another embodiment according to the present invention. The difference of FIG. 5 from the block diagram shown in FIG. 4 is only an added symbol de-interleaver 416. The symbol de-interleaver 416 receives the equalized signal and the channel state information of the sub-carrier to implement the de-interleaving for the OFDM symbols before the demapper 412 demapps the equalized signal.

Figure 6A:
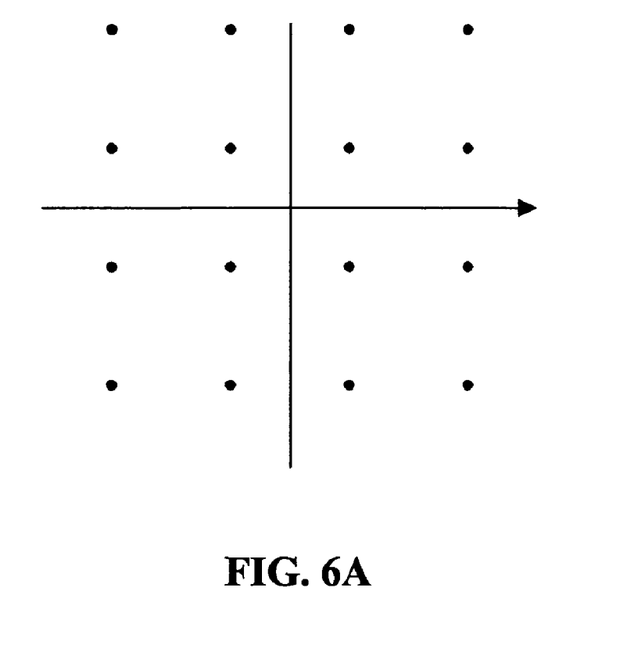
FIG. 6A shows an equalized result of a 16-QAM signal propagating through a noise free environment.
Figure 6B:
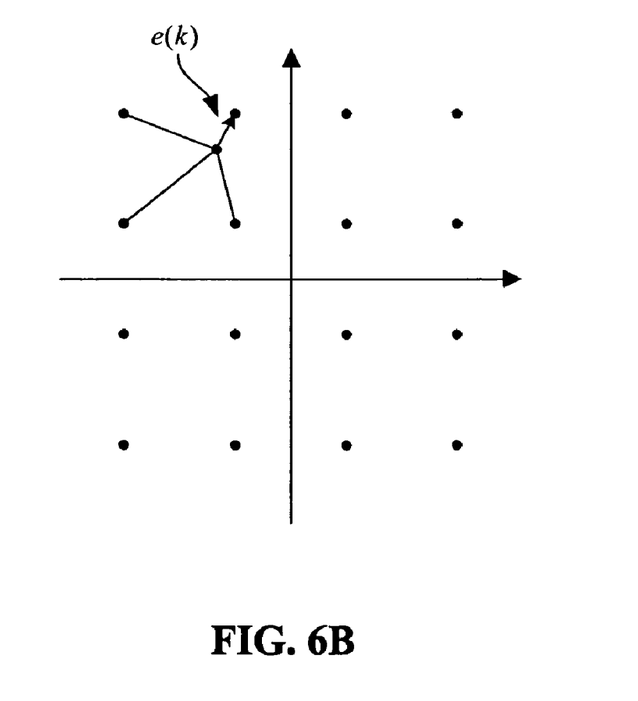
FIG. 6B shows an equalized result of a 16-QAM signal propagating through a noisy environment and the equalized signal containing a noise-induced component defined as an error signal e(k).

The channel state information (CSI) of the sub-carrier will be employed to correct the error for the sub-carrier of the OFDM signal received by the DVB-T receiver when the demapper 412 is demapping the 16-QAM equalized signal into 4 soft signals representing information of 4-bits from a constellation map, as shown in FIGS. 6A and 6B. Please refer to FIGS. 6A and 6B for further explanations. FIG. 6A shows an equalized result of a 16-QAM signal propagating through a noise free environment. Theoretically, after the 16-QAM signal propagates through an ideal noise free channel, the equalized signal will be demapped exactly according to the definition of constellation map as shown in FIG. 6A. However, the equalized signal certainly contains a noise component as shown in FIG. 6B after transmitting through a channel with AWGN, co-interference, etc. in the receiver. The error signal e(k) is defined as the distant vector from the equalized data point to the nearest constellation point.

Please refer to FIG. 7A~7D, which illustrate four embodiments of the proposed methods for channel state information (CSI) generation according to the present invention.

First, referring to FIG. 7A, the method for the channel state information (CSI) generation is described as follows. As mentioned above, the apparatus for CSI generation comprises a calculating unit 702a, an averaging unit 704a and a channel state information generating unit 706a. The calculating unit 702a receives the receiving error signal e(k) and a channel response signal c(k), obtains a magnitude of an error signal e(k) and a magnitude of a channel response signal c(k) of the sub-carrier by receiving the error signal e(k) and the channel response signal c(k) from the equalizer. The calculating unit 702a squares the magnitude of the error signal e(k). In the meanwhile, the calculating unit 702a squares the magnitude of the channel response signal c(k) to get the calculation result b(k). The calculating unit 702a multiplies the square of the magnitude of the error signal e(k) by the square of the magnitude of the channel response signal c(k) to get the calculation result $\alpha_1(k)$ for each sub-carrier. Then, the averaging unit 704a averages the $\alpha_1(k)$ for each sub-carrier by a symbol based Infinite Impulse Response (IIR) average unit in the averaging unit 704a to get the calculation result a(k). Then, the channel state information generating unit 706a calculates the ratio of a(k) and b(k). Finally, the channel state information csi(k) as b(k)/a(k) is generated for the sub-carrier of the OFDM symbol.

Figure 7A:
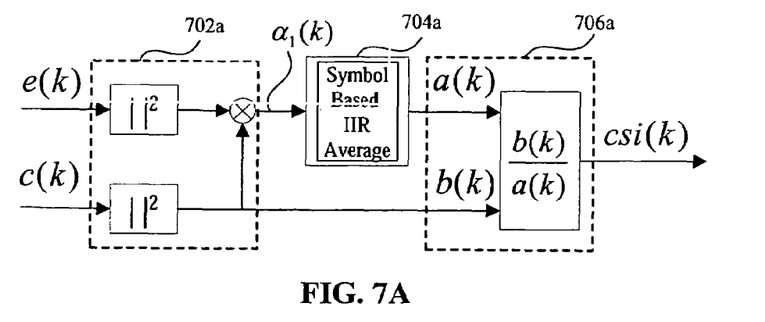
FIG. 7A~7D illustrate four embodiments of four proposed schemes of channel state information (CSI) generation according to the present invention.

The method shown in FIG. 7A isolates the noise signal from the channel response signal c(k). For a mobile environment, the calculation result b(k) is changing rapidly with time. However, the variance of a(k) is slow. The method and apparatus shown in 7A can provide a better estimation of the instantaneous CSI by isolating the fast changing component from the slowly changing component. Therefore, the present method ensures good performance in a mobile environment with either color noise or white noise.

Figure 7B:
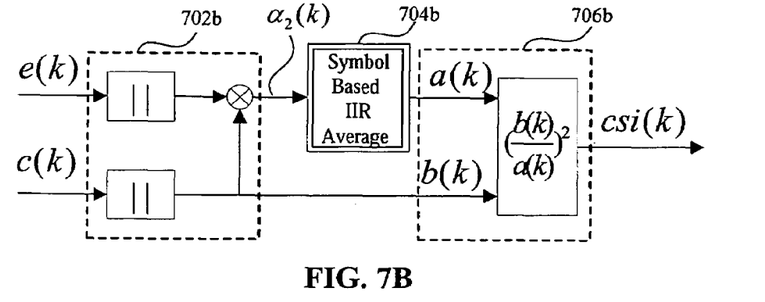

Please refer to FIG. 7B, it shows a variation of the proposed method and apparatus according to the embodiment shown in FIG. 7A.

In this method, the calculating unit 702b omits the squaring step before the multiplying step to get the calculations result $\alpha_2(k)$ for each sub-carrier but the channel state information generating unit 706b implements squaring the ratio b(k)/a(k)

to generate the channel state information csi(k). The advantage brought by this variation of the proposed method is that the required bit number of the memory storage in the averaging units 704a and 704b can be reduced.

Figure 7C:
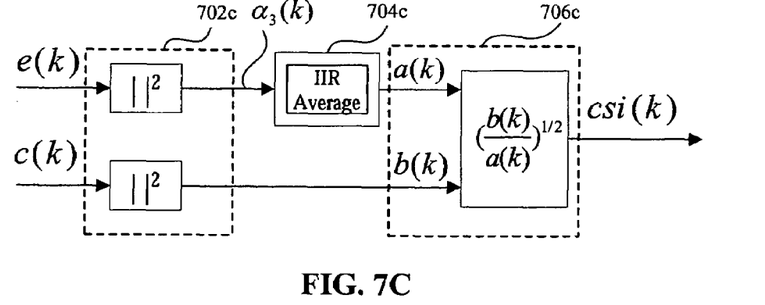

Please refer to FIG. 7C, comparing to the previous method shown in FIG. 7A, wherein the calculating unit 702c omits the multiplying step so that the calculation result a(k) of the averaging step (averaged by an IIR average unit in the averaging unit 704c) is derived only from the calculation result $\alpha_3(k)$ of the error signal e(k) and the calculation result b(k) of squaring the magnitude of the channel response signal c(k) remains. Furthermore, the channel state information generating unit 706c takes the square root of the ratio b(k)/a(k) to generate the channel state information csi(k). Comparing to two previous methods, the current described method has slightly inferior performance in color noise environment. However, it has the advantage of quick convergence in initialization stage in an environment with long channel impulse response. The reason for the quick initialization is that the channel response is weighted more in the calculation of CSI and the channel response can be estimated with small delay in nature.

Figure 7D:
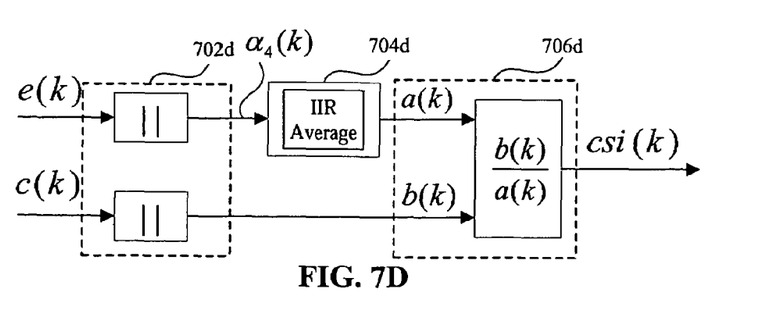

Please refer to FIG. 7D, which shows a simplified method related to the method shown in FIG. 7C. In the method of FIG. 7D, the calculating unit 702d omits the step of squaring the magnitude of the error signal e(k) and the channel response signal c(k) of the sub-carrier before the averaging step (i.e., averaged by an IIR average unit in the averaging unit 704d). Same as the calculation result $\alpha_3(k)$ shown in FIG. 7C, the calculation result a(k) of the averaging step is derived only from the calculation result $\alpha_4(k)$ of the error signal e(k). In addition, the channel state information generating unit 706d omits the step of taking the square root on the ratio b(k)/a(k) to generate the channel state information csi(k). Same as the method shown in FIG. 7B, the memory bit-width in the averaging units 704c and 704d can also be reduced compared to that of FIG. 7C.

Figure 8A:
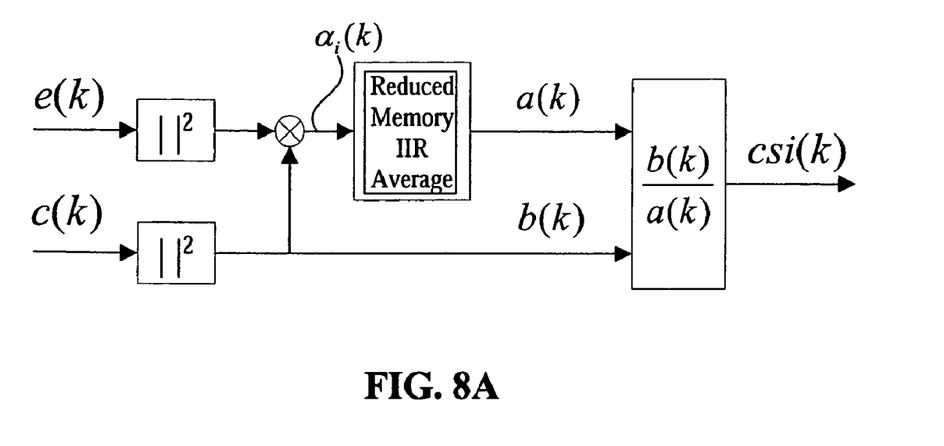
FIGS. 8A and 8B illustrate two modified implementations of the proposed CSI generation in order to reduce the required memory size according to the present invention.

Please refer to FIG. 8A, illustrating a modified implementation of the proposed CSI generation in order to reduce the required memory capacity according to the present invention. As shown in FIG. 7A, FIG. 7B, FIG. 7C and FIG. 7D, it is considered that the stored quantities of a plurality of continuous sub-carriers as the same so as to reduce the size of the memory of the IIR average unit during the averaging step. Initially, the memory of the IIR average unit has a storage element for each sub-carrier indexing by k, and the memory size can be reduced by assuming that the continuous N sub-carriers have the same noise signal variances. Thus, we can use the same storage unit for these sub-carriers. In addition, the memory size is reduced by a factor of N, for example, when N=2, the sub-carrier $2k$ and the sub-carrier $2k+1$ will use the same memory location while storing $\alpha_i(k)$ and $\alpha_i(k+1)$ into the memory or retrieving the averaged values $\alpha_i(k)$ and $\alpha_i(k+1)$ from the memory.

Figure 8B:
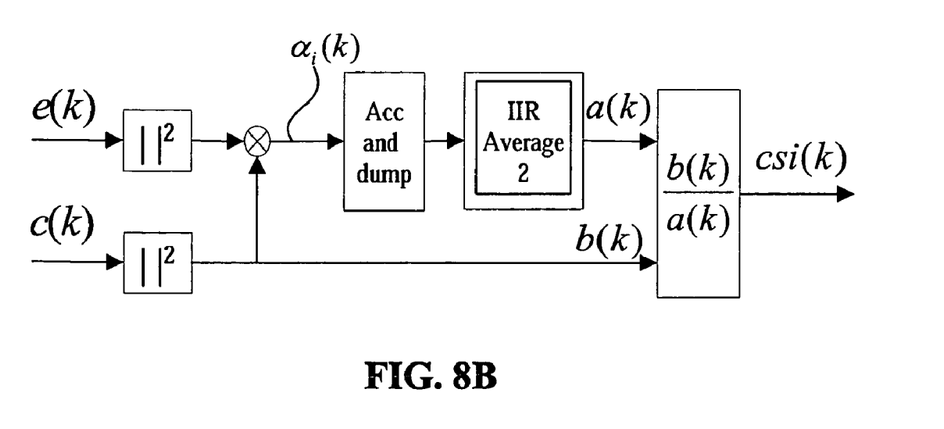

Please refer to FIG. 8B, which illustrates another modified implementation of the proposed CSI generation. This implementation has an advantage of reducing the size of the memory. In addition, this implementation has another advantage of reducing the number of times of accessing the memory. In this implementation, the average unit first accumulates the noise signal variances, $\alpha_i(k)$, for N continuous sub-carriers and then updates the corresponding values in the memory to reduce a number of times accessing a memory during the averaging step. For example, if N=2, accumulating the noise signal variance values of the sub-carrier $2k$ and the sub-carrier $2k+1$ and then storing the noise signal variance values to the same memory storage.

Figure 9:
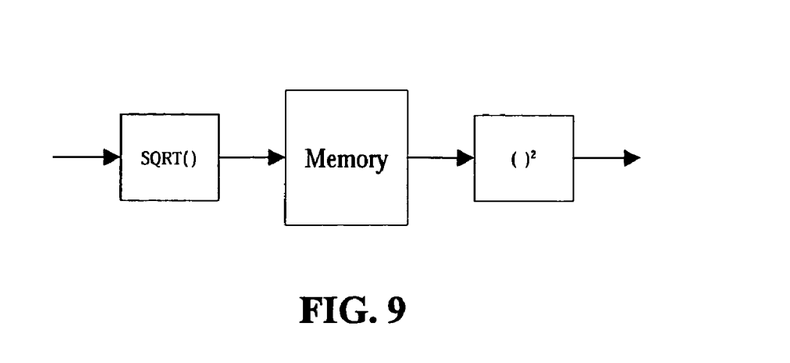
FIG. 9 illustrates another implementation to reduce the required bit number of a memory according to the present invention.

Please refer to FIG. 9 illustrating another implementation to reduce the required bit number of a memory according to the present invention. It takes the square root of the quantity before storing it into the memory and restores it by squaring when retrieving from the memory during the averaging step. The method reduces the required bit number of each stored value accordingly to reduce the required memory size.

Figure 10:
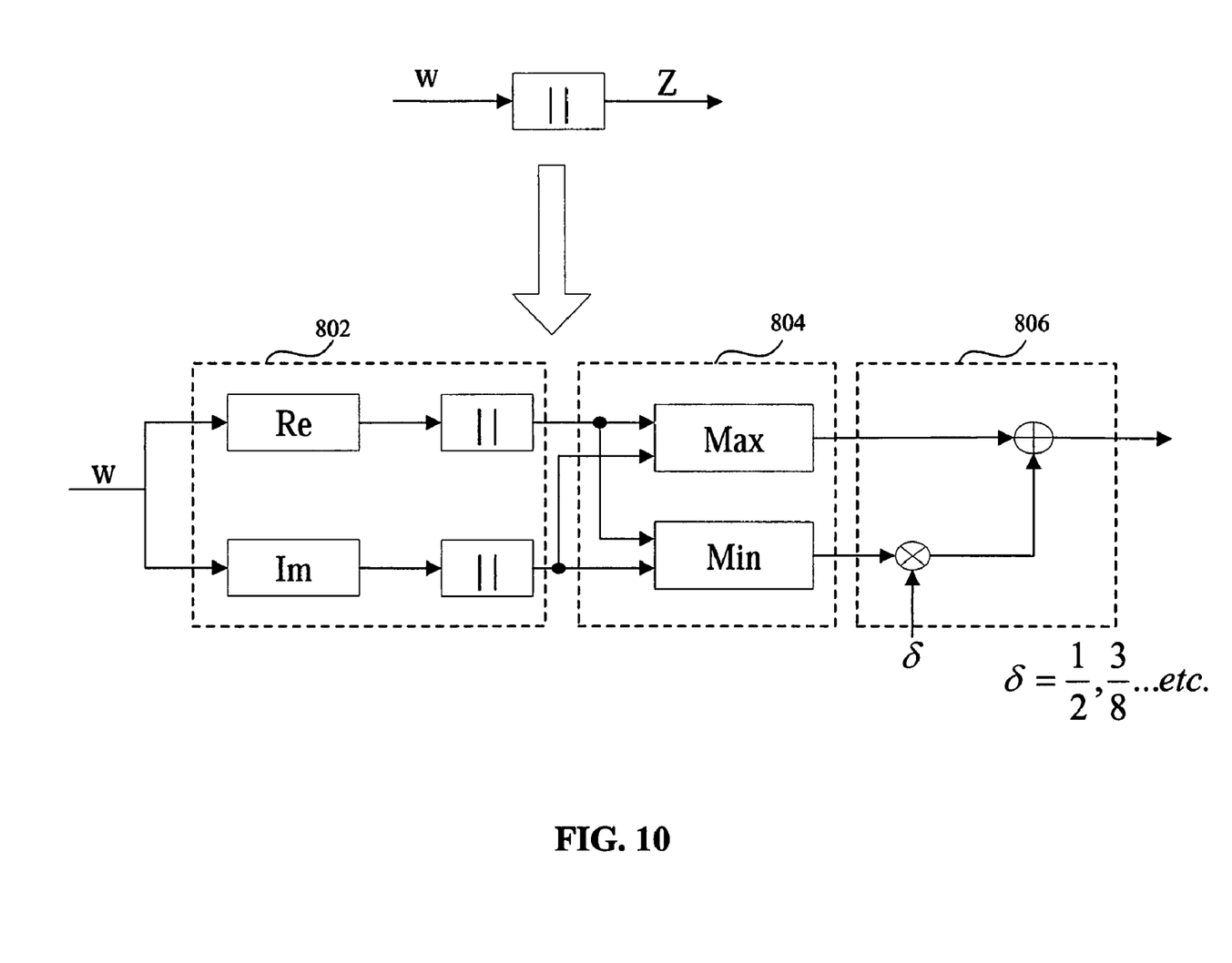
FIG. 10 illustrates a simplified implementation for calculating the absolute value of a complex number.

Please refer to FIG. 10, illustrating a simplified implementation for obtaining the magnitude of a complex number W, i.e., calculating the absolute value Z. The implementation is described below:

The calculating unit 702 of the apparatus for CSI generation 414 comprises a separator 802, a comparator 804, and a multiplexer 806. The separator 802 separates a real portion "Re" and an imaginary portion "Im" from the error signal e(k) or the channel response signal c(k) of the sub-carrier. Then, the respective absolute values of the real portion and imaginary portion are obtained. The comparator 804 determines which magnitude of the real portion and imaginary portion is larger than the other, and multiplies the smaller one "Min", of the real portion and imaginary portion by a weighting coefficient 6. The multiplexer 806 adds the larger one "Max", of the real portion "Re" and imaginary portion "Im" by the small one "Min" weighted by the weighting coefficient 6 to get an approximated result of calculating absolute values.

Conclusively, the present invention provides a method and apparatus exhibiting good performance to work well in either a mobile channel or a static channel with either co-channel interference or AWGN. In addition, it converges quickly at initialization stage for the receiver operating in an environment with a long channel impulse response.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A method used in an OFDM receiver for channel state information generation for an OFDM symbol having a plurality of sub-carriers, the method comprising the step of:
   obtaining a magnitude of an error signal and a magnitude of a channel response signal of each of the sub-carriers;
   combining the magnitude of the error signal and the magnitude of the channel response signal of each sub-carrier;
   averaging the results of the combining step for the sub-carriers;
   calculating a ratio on the magnitude of the channel response signal and the average of the results of the combining step; and
   generating a channel state information according to the ratio for said each of the sub-carriers.

2. The method of claim 1, further comprising a step of computing the error signal of the plurality of sub-carriers before the step of obtaining the magnitude of the error signal and the magnitude of the channel response signal.

3. The method of claim 1, wherein calculating the ratio is obtained by dividing the magnitude of the channel response signal by the average of the results of the combining step.

4. The method of claim 1, wherein the combining step is multiplying the magnitude of the error signal by the magnitude of the channel response signal.

5. The method of claim 1, further comprising a step of squaring the magnitude before the combining step.

6. The method of claim 1, further comprising a step of squaring the ratio to generate the channel state information.

7. The method of claim 1, wherein the step of obtaining the magnitude comprises the sub-steps of:
- separating a real portion and an imaginary portion from the error signal and channel response signal of the sub-carrier;
- obtaining respective magnitudes of the real portion and the imaginary portion;
- determining which magnitude of the real portion and imaginary portion is larger than the other and multiplying the small one of the real portion and imaginary portion by a weighting coefficient; and
- adding the larger one of the real portion and imaginary portion by the small one multiplied by the weighting coefficient together to get an approximated result of obtaining the magnitudes.

8. The method of claim 1, wherein the error signals of a plurality of continuous sub-carriers are considered as the same to reduce a number of times for accessing a memory during the averaging step and occupied bits in the memory.

9. The method of claim 1, further comprising a step of accumulating the error signals of a plurality of continuous sub-carriers and dumping to a memory to reduce a number of times for accessing the memory during the averaging step.

10. The method of claim 1, further comprising steps of taking the square root of the result of the combining step of the sub-carrier before storing into a memory to reduce the occupied bits in the memory and squaring the square root of the error signal after retrieving from the memory.

11. An apparatus for channel state information generation for an OFDM symbol having a plurality of sub-carriers, the apparatus comprising:
- a calculating unit, receiving an error signal and a channel response signal to obtain the respective magnitudes of each sub-carrier, combining the magnitude of the error signal and the magnitude of the channel response signal of each sub-carrier as a combined result;
- an averaging unit, averaging the combined results of the plurality of sub-carriers; and
- a channel state information generating unit, calculating a ratio on the magnitude of the channel response signal and the average of the combined results to generate the channel state information for the sub-carrier.

12. The apparatus of claim 11, further comprising an error signal calculation unit, computing the error signals of the plurality of sub-carriers according to each equalized signals of the plurality of sub-carriers.

13. The apparatus of claim 11, wherein the calculating unit combines the magnitude of the error signal and the magnitude of the channel response signal by multiplying the magnitude of the error signal by the magnitude of the channel response signal.

14. The apparatus of claim 11, wherein the calculating unit further squares the magnitudes of the error signal and the channel response signal respectively before the combining step.

15. The apparatus of claim 11, wherein the channel state information generating unit further squares the ratio to generate the channel state information for the sub-carrier.

16. The apparatus of claim 11, wherein the calculating unit further squares the magnitudes of the error signal and the channel response signal respectively before the averaging step and takes the square root on the ratio to generate the channel state information for the sub-carrier.

17. The apparatus of claim 11, wherein the calculating unit further comprises a separator to separate a real portion and an imaginary portion and obtain the respective magnitudes of the real portion and the imaginary portion of the error signal and the channel response signal respectively for the sub-carrier.

18. The apparatus of claim 17, further comprising a comparator, determining which magnitude of the real portion and the imaginary portion is larger than the other.

19. The apparatus of claim 18, further comprising a multiplexer, adding the small one of the real portion and imaginary portion by a weighting coefficient and the larger one together to get an approximated result of obtaining the magnitudes.

20. The apparatus of claim 11, wherein the error signals of a plurality of continuous sub-carriers are considered as the same to reduce a number of times for accessing a memory during the averaging step and occupied bits in the memory.

21. The apparatus of claim 11, wherein the averaging unit accumulates the error signals of a plurality of continuous sub-carriers then updates corresponding values in a memory to reduce a number of times for accessing the memory.

22. The apparatus of claim 11, wherein the averaging unit takes the square root of the error signal of the sub-carrier before storing into a memory and squares the square root of the error signal after retrieving from the memory to reduce the occupied bits in the memory.

23. A DVB receiver, the receiver comprising:
- a channel estimator, estimating a channel response signal according to a pilot information of a sub-carrier;
- an equalizer, generating a equalized signal of the sub-carrier base on estimated channel response signal and generating an error signal of the sub-carrier;
- an apparatus for channel state information generation, coupled to the channel estimator and the equalizer, receiving the channel response signal and the equalized signal of the sub-carrier respectively, generating the channel state information for an OFDM symbol having a plurality of sub-carriers, the apparatus further comprising:
- an error signal calculation unit, computing an error signal of the sub-carrier according to the equalized signal received from the equalizer;
- a calculating unit, receiving the error signal and the channel response signal to obtain the respective magnitudes of the plurality of sub-carriers, combining the magnitude of the error signal and the magnitude of the channel response signal of each sub-carrier;
- an averaging unit, averaging the combining results of the plurality of sub-carriers obtained in the calculating unit; and
- a channel state information generating unit, calculating a ratio on the magnitude of the channel response signal of each of the sub-carriers and the average of the combining results to generate the channel state information for said each of the sub-carriers.

24. The DVB receiver of claim 23, wherein the calculating unit combines the magnitude of the error signal and the magnitude of the channel response signal by multiplying the magnitude of the error signal by the magnitude of the channel response signal.

25. The DVB receiver of claim 23, wherein the calculating unit further squares the magnitudes of the error signal and the channel response signal respectively before the combining step.

26. The DVB receiver of claim 23, wherein the channel state information generating unit further squares the ratio to generate the channel state information for the sub-carrier.

27. The DVB receiver of claim 23, wherein the calculating unit further squares the magnitudes of the error signal and the channel response signal respectively before the averaging step and takes the square root on the ratio to generate the channel state information for the sub-carrier.

28. The DVB receiver of claim 23, wherein the calculating unit further comprises a separator to separate a real portion and an imaginary portion and obtain the respective magnitudes of the real portion and the imaginary portion of the error signal and the channel response signal respectively for the sub-carrier.

29. The DVB receiver of claim 28, further comprising a comparator, determining which magnitude of the real portion and imaginary portion is larger than the other.

30. The DVB receiver of claim 29, further comprising a multiplexer, adding the small one of the real portion and imaginary portion by a weighting coefficient and the larger one together to get an approximated result of obtaining the magnitudes.

31. The DVB receiver of claim 23, wherein the magnitudes obtained in the calculating unit of a plurality of continuous sub-carriers are considered as the same to reduce a number of times for accessing a memory during the averaging step and occupied bits in the memory.

32. The DVB receiver of claim 23, wherein the averaging unit accumulates the magnitudes obtained in the calculating unit of a plurality of continuous sub-carriers then updates corresponding values in a memory to reduce a number of times for accessing the memory.

33. The DVB receiver of claim 23, wherein the averaging unit takes the square root of the magnitudes obtained in the calculating unit of the sub-carrier before storing into a memory and squares the square root of the magnitudes obtained in the calculating unit after retrieving from the memory to reduce the occupied bits in the memory.

* * * * *